US008256785B2

(12) United States Patent

Knopf

(10) Patent No.: US 8,256,785 B2

(45) Date of Patent: Sep. 4, 2012

(54) WHEELCHAIR HAVING HEIGHT-ADJUSTABLE AXLE MOUNTS

(75) Inventor: Michael Knopf, Dìelheím (DE)

(73) Assignee: Sunrise Medical GmbH & Co. KG, Malsch/Heidelberg (DE)

( * ) Notice: Subject to any disclaimer, the term of this patent is extended or adjusted under 35 U.S.C. 154(b) by 422 days.

(21) Appl. No.: 12/696,543

(22) Filed: Jan. 29, 2010

(65) Prior Publication Data

US 2010/0194071 A1 Aug. 5, 2010

(30) Foreign Application Priority Data

Jan. 30, 2009 (EP) .................................... 09151773

(51) Int. Cl.
*B62D 21/03* (2006.01)
*B62M 1/14* (2006.01)

(52) U.S. Cl. ................................ 280/250.1; 280/304.1

(58) Field of Classification Search ............... 280/250.1, 280/304.1
See application file for complete search history.

(56) References Cited

U.S. PATENT DOCUMENTS

| | | | |
|---|---|---|---|
| 4,082,348 A | 4/1978 | Haury | |
| 5,360,224 A * | 11/1994 | Geiger et al. | 280/250.1 |
| 5,382,036 A * | 1/1995 | Counts et al. | 280/250.1 |
| 5,421,598 A | 6/1995 | Robertson | |
| 6,296,265 B1 * | 10/2001 | Lovins | 280/250.1 |
| 6,464,243 B2 * | 10/2002 | Roche | 280/650 |
| 6,974,194 B2 * | 12/2005 | Schreiber et al. | 301/111.06 |
| 7,192,042 B2 | 3/2007 | Cerreto | |
| 7,520,518 B2 * | 4/2009 | Peterson et al. | 280/250.1 |
| 8,002,300 B2 * | 8/2011 | Ludovici et al. | 280/250.1 |
| 2006/0055143 A1 * | 3/2006 | Schreiber et al. | 280/250.1 |
| 2006/0087103 A1 * | 4/2006 | Schreiber et al. | 280/649 |
| 2009/0283983 A1 * | 11/2009 | Horacek et al. | 280/250.1 |

FOREIGN PATENT DOCUMENTS

| | | |
|---|---|---|
| WO | WO9513782 A1 | 5/1995 |
| WO | WO9816182 A1 | 4/1998 |

OTHER PUBLICATIONS

European Search Report, EP09151773, Jul. 1, 2009.

* cited by examiner

*Primary Examiner* — Paul N Dickson
*Assistant Examiner* — Wesley Potter
(74) *Attorney, Agent, or Firm* — MacMillan, Sobanski & Todd, LLC

(57) ABSTRACT

A wheelchair frame assembly comprises a frame member having a first leg adapted to support a seat and a second leg configured to support a caster wheel. An axle mounting assembly connects an axle tube to the frame member. The axle mounting assembly includes an axle tube mount, a frame mount, and a spacer. The spacer is configured to alter the distance between the frame member and the axle tube and transfer longitudinal forces between the axle tube mount and the frame mount.

20 Claims, 13 Drawing Sheets

WHEELCHAIR HAVING HEIGHT-ADJUSTABLE AXLE MOUNTS

CROSS-REFERENCE TO RELATED APPLICATIONS

This application claims priority from European Patent Application No. EP09151773, filed Jan. 30, 2009, the disclosure of which is incorporated herein by reference.

BACKGROUND OF THE INVENTION

This invention relates in general to wheelchairs having a height adjustment capability. In particular, this invention relates to a wheelchair fame and axle assembly having a height adjustment capability.

Wheelchairs are provided with frame assemblies that support wheels to provide mobility for physically challenged users. The frame assembly may include a seat support, a backrest support and a lower leg support. The frame may include an axle that supports the wheels for rotation. The frame may provide for relative height adjustment of the axle by way of adjustable axle supports that include apertures that are fastened together in various relative orientations.

With use, the fastened connections may work loose over time. The apertures that receive fasteners may tend to sustain damage over time through wear caused by the fasteners. One common design is to make the support members thicker, but this raises the weight of the wheelchair frame.

Therefore, it would be desirable to provide a wheelchair frame assembly that provides a lightweight and rigid height-adjustable connection between a frame member for supporting a component such as a seat and an axle tube that is less susceptible to wear.

SUMMARY OF THE INVENTION

This invention relates to a wheelchair frame assembly that includes a frame member and an axle mounting assembly. The frame member has a first leg adapted to support a seat and a second leg configured to support a caster wheel. An axle mounting assembly connects an axle tube to the frame assembly. The axle tube supports a drive wheel for rotation. The axle mounting assembly includes an axle tube mount and a frame mount. The axle tube mount has a clamp end configured to engage a portion of the axle tube and a post end that extends from the clamp end. The frame mount has a clamp end configured to engage a portion of the frame member and a sleeve end configured to telescopically connect the axle tube mount post end. At least one spacer element is provided and is configured to cooperate with the axle tube post end to alter the distance between the frame member and the axle tube.

The axle tube mount clamp end of the axle mounting assembly includes a support surface and the frame mount sleeve end includes a load face. The at least one spacer element cooperates with the axle tube mount clamp end support surface and the frame mount sleeve end load to transfer longitudinal forces between the axle tube mount and the frame mount through the spacer element. The axle tube mount post end is telescopically received in the frame mount sleeve end. A collar is configured to be disposed over the frame mount sleeve end. The collar has an aperture that is aligned with an aperture formed through the sleeve end. The collar aperture and the sleeve end aperture are aligned with a threaded aperture formed in the axle tube mount post end. A fastener clamps the collar and sleeve end to the post while maintaining longitudinal force transfer through the spacer element.

A wheelchair is configured for use with the frame assembly and axle mounting assembly. The wheelchair is adapted to transfer the weight of a user from the frame assembly to the axle tube through the spacer elements.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
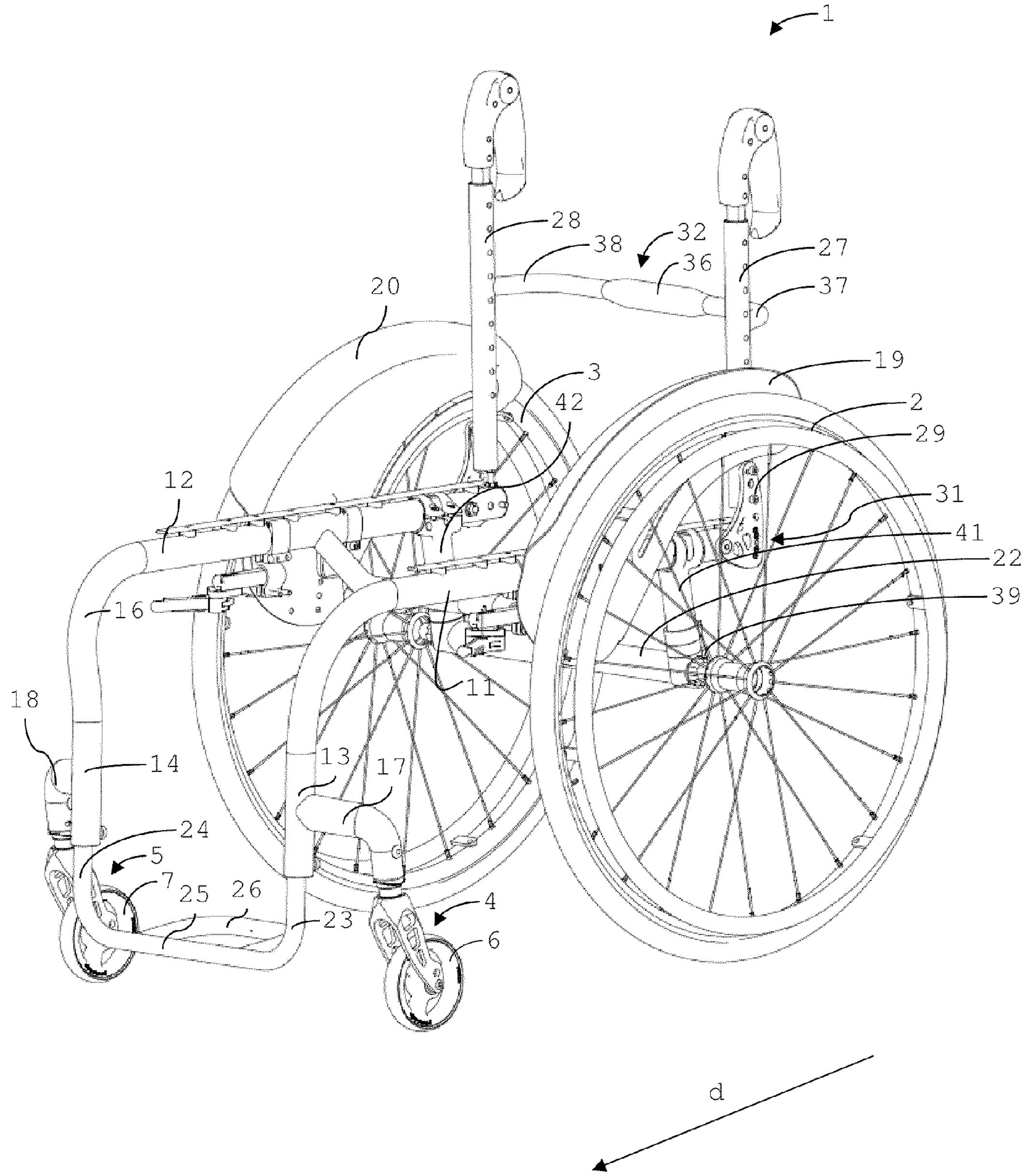
FIG. 1 is a perspective view of a wheelchair with the seat and backrest removed for clarity.

A wheelchair frame assembly, as shown and described, provides a lightweight and rigid height-adjustable connection between a frame member for supporting a part such as a seat and an axle tube that is less susceptible to wear. The frame assembly includes at least one element for transferring a longitudinally directed force from an end of a tubular member to at least one first support surface fixed relative to an inner member.

In an embodiment, the at least one element includes at least one spacer between at least one of the first support surfaces and the tubular member.

In a variant, at least one of the spacers applied to each of the frame mount and axle tube mount is at least partly made of a material other than metal.

In a further variant, at least one spacer abuts a load-bearing end face of the tubular member.

Also, at least one of the spacers applied to each of the frame mount and axle tube mount may surround the inner member over at least 180°.

Furthermore, an axle tube mount may have a post end extending from an axle mount clamp end to an end inserted into a sleeve end of the frame mount and at least one of the spacers may be supported by the support surface provided on the axle tube mount clamp end.

In an embodiment, the axle tube mount post end extends from a support surface of the axle tube mount clamp end.

In a variant of this embodiment, the post end and the axle tube clamp end are integral parts of a single component.

At least two of the frame members, for supporting a seat, that connect to an axle tube may correspond two side frame members, located on opposite sides of a central longitudinal axis that is parallel to a generally forward (or rearward) direction of displacement of the wheelchair.

An embodiment includes at least two assemblies for connecting two respective frame members to a common axle tube.

In a further embodiment, the frame mount is connected to the frame member by a mechanical connector, in particular a connector movable along the frame member.

Each assembly for connecting a frame member to an axle tube may include at least one clamp for clamping the frame mount to the axle tube mount.

According to another aspect, a method adjusting the relative spacing between an axle assembly and a frame member is characterized by transferring a longitudinally directed force from an end of the frame mount to at least one first support surface that cooperates with the axle tube mount post end via at least one further element.

In an embodiment, each spacer is selected from a set of spacers, in particular a set of spacers differing in at least one of dimensions and composition.

The wheelchair axle mounting assembly is based on the surprising insight that by transferring a longitudinally directed force from an end of the frame mount to at least one first support surface in fixed connection with the inner member via at least one further element, it is not necessary to provide holes for height adjustment along the length of the frame mount. The at least one element limits the extent of the inner member within the frame mount. The element or elements transfer at least part of the weight of the occupied wheelchair to the axle tube. Because such an element transfers a longitudinally directed force from an end of the frame mount, it need not be as long as the frame mount, and can therefore be lighter. Because the inner member can be telescopically inserted into the frame mount, it is, when not held in position by the spacer(s) and/or further holding means, freely movable within the frame mount. Thus, the length of the assembly can be adjusted, for which purpose further elements are added, the elements are replaced, or a different support surface in fixed connection with the inner member is chosen.

It is envisaged that the at least one element include at least one spacer between at least one of the first support surfaces and the frame mount. Because the spacers are provided between the frame mount and at least one support surface, they do not extend over the length of the frame mount. They merely support the frame mount relative to the structure comprising the inner member. Because the spacers are provided in addition to the inner member, they need only transmit longitudinal forces, and can thus be appropriately dimensioned in the lightest possible way. The inner member and frame mount provide rigidity. When the position of the frame mount relative to the inner member is changed, spacers are replaced, removed or added. A further effect of using spacers manifests itself when there are two or more assemblies for connecting a frame member for supporting a part for occupation by a user to an axle tube, in that one can easily ensure that the height is the same on both sides of the conveyance by counting the clearly visible spacers. The spacers can be visibly distinct to make this verification even easier.

If at least one of the spacers is at least partly made of a material other than metal, the frame mount and inner member can be made of metal, which is easy to form in the desired shape. The spacers prevent metal-on-metal contact, which serves to reduce noise when the personal conveyance is moving.

If at least one spacer abuts a longitudinal end face of the frame mount, then it is possible to have the spacers lie flush with the frame mount or parts provided on the frame mount, so that there is a smooth transition in longitudinal direction. Sharp edges are avoided. Moreover, there are then no spacers adjacent the frame mount, so that the spacer or stack of spacers is as short as possible.

If at least one of the spacers of each assembly including a frame mount and an inner member surrounds the inner member over at least 180°, the spacer will, if provided with the appropriate inner diameter, be retained on the inner member. It will only be possible to slide it onto the inner member in longitudinal direction or, if the spacer hasn't got a completely closed cross-sectional shape and is resilient enough, to open it up against an elastic force tending to ensure that it embraces the inner member.

If the post end of each axle tube mount extends from a base of a clamp end to an end inserted into the sleeve end of the frame mount and at least one of the spacers is supported by a first support surface provided on the base, then a compact axle mounting assembly is provided, because the spacers can be provided immediately adjacent, e.g. around, the axle tube mount post end.

If one of the axle tube mount post end and the frame mount sleeve end extends from an axle tube clamp, then the axle tube clamp can be oriented immediately beneath the frame member for supporting a seat of the wheelchair. This relative orientation of the clamp to frame provides a smaller moment applied to the axle. This smaller moment reduces the tendency of a user's weight to cause a change in rear wheel camber settings.

If the axle tube mount post end and the axle tube clamp end are integral parts of a single component, the wheel can be brought relatively close to the axle mounting assembly. There is also a stiff connection between the post end and the axle tube. All this contributes to increasing the allowable user weight that can be carried without causing changes in wheel camber.

If at least two of the frame members connected to an axle tube correspond to two side frame members, located on opposite sides of a central longitudinal axis that is parallel to a direction of displacement of the wheelchair, then the lateral wheelbase, or width of the frames, can be larger without increasing the distance between the tube clamps, i.e. the point to which the weight of the occupant is transferred.

Providing at least two assemblies for connecting two respective frame members to a common axle tube further stiffens the frame to prevent sagging under the weight of the occupant. This again allows one to place the wheels closer to the frame without risk of having them contact the frame due to a change in camber under the weight of the occupant.

If the frame mount is connected to the frame member by way of a mechanical connector, then the wheelchair can be manufactured in different versions for occupants of different weight and/or size at a relatively low cost. Using the same basic frame, in particular the same side frame members, a taller height of the wheelchair, especially the occupant seat, can be manufactured using a longer frame mount or axle tube mount If the intended user is heavier, a different diameter and/or different wall thickness of the frame mount sleeve end can be chosen. A connector, such as a frame mount clamp end, that is movable along the frame member allows one to change the longitudinal wheelbase (i.e. distance between front and rear wheels in direction of movement).

If each axle mounting assembly for connecting a frame member to an axle tube includes at least one clamp for clamping the frame mount sleeve end to the axle tube mount post end, then the assembly is kept together in use. The post end cannot be retracted from the sleeve end. Moreover, a compressive load is maintained on the spacers. A further effect is that there can be more play between the sleeve end and the post end, because the play is removed by the clamp in at least one longitudinal position.

A method of adjusting a height of a wheelchair, in which each spacer is selected from a set of spacers, in particular a set of spacers differing in at least one of dimensions and composition, allows one to set the length and/or further properties of the interconnection between the frame member and the axle tube by an appropriate choice of spacers.

Referring now to the drawings, there is illustrated in FIG. 1, a wheelchair, shown generally at 1. The wheelchair 1 shown here by way of example is supported by left and right rear main wheels 2, 3 and left and right caster wheel assemblies 4, 5, comprising caster wheels 6, 7. The wheelchair 1 comprises a base frame and a backrest frame 8 (see FIG. 5).

The base frame comprises left and right side frame members 9, 10, that are arranged on opposite sides of a central axis that is aligned with a direction "d" of forward displacement of the wheelchair 1. The left and right side frame members 9, 10 are generally L-shaped. In other words, the wheelchair 1 has an open frame. The side frame members 9, 10 each include a longitudinally extending first leg 11,12 and a second leg 13,14 that extends at an angle from the first leg. Each first leg 11,12 transitions into the second leg 13,14 via a curved section 15,16. As shown in FIG. 1, the first legs 11,12 extend generally horizontally and the second legs 13,14 extend downwardly from the first legs 11,12 when viewed relative to a supporting surface such as the ground. It is noted that the angle of the first legs 11,12 to a generally horizontal support (e.g., the ground) can be adjusted by adjusting the rear height of the first legs 11,12 above the ground.

The first legs 11,12 are arranged for supporting a seat (not shown) of the wheelchair 1. For example, a seat sling (not shown) can be slung between the first legs 11,12 of the side frame members 9,10, on top of which a seat cushion (not shown) of any shape or configuration can be placed.

Figure 2:
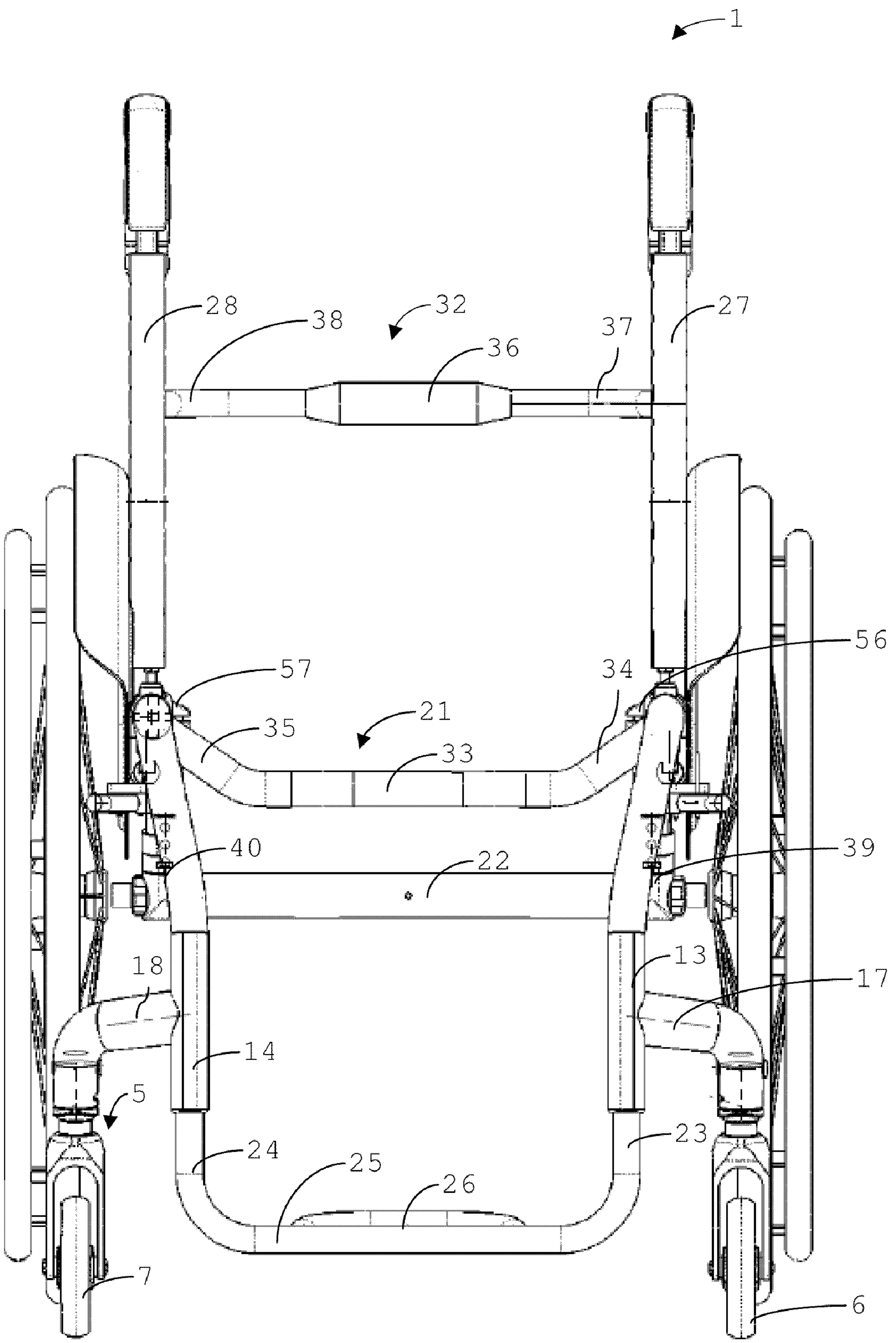
FIG. 2 is a front elevational view of the wheelchair of FIG. 1.
Figure 3:
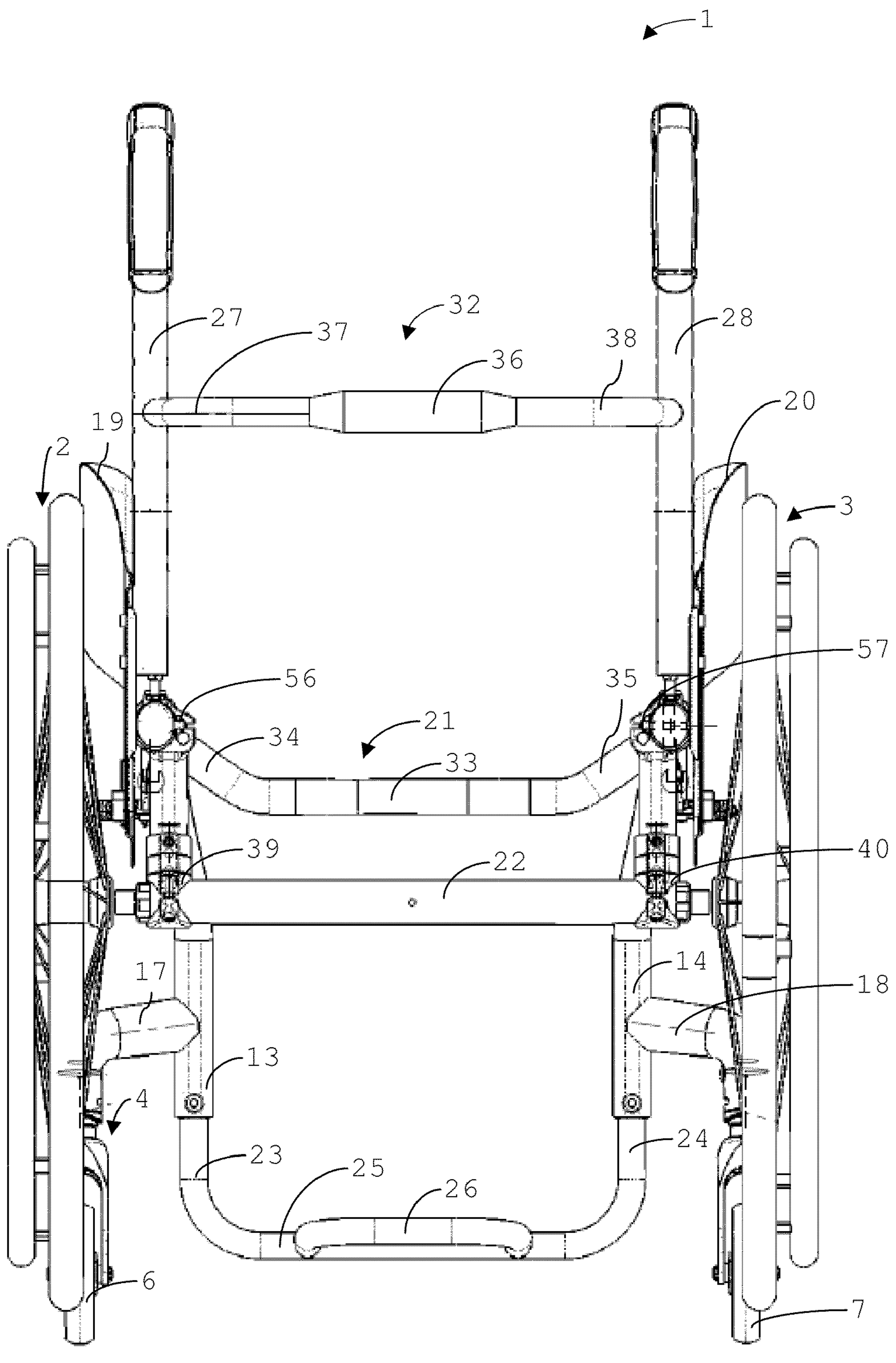
FIG. 3 is a rear elevational view of the wheelchair of FIGS. 1 and 2.
Figure 4:
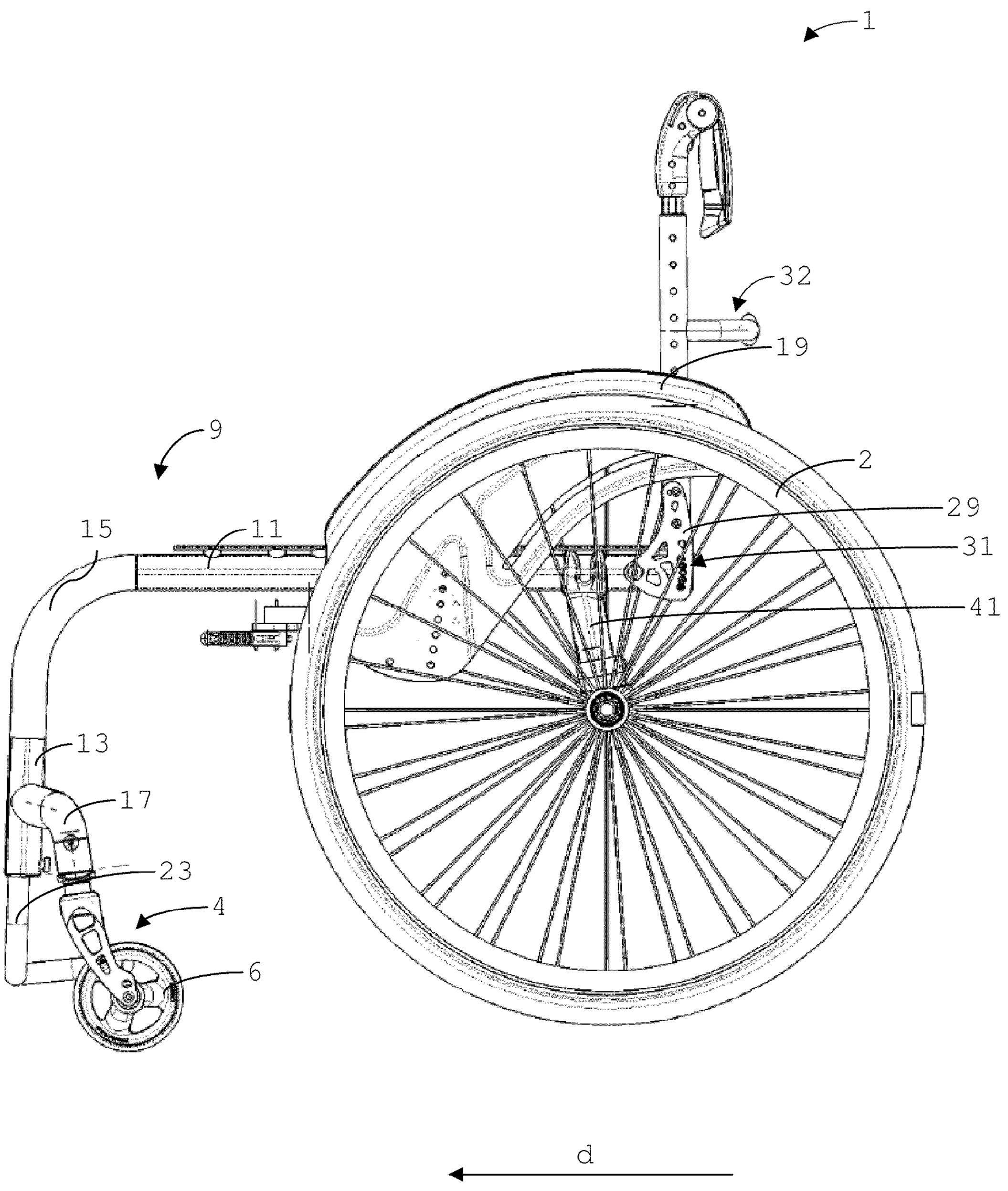
FIG. 4 is a side elevational view of the wheelchair of FIGS. 1-3.
Figure 5:
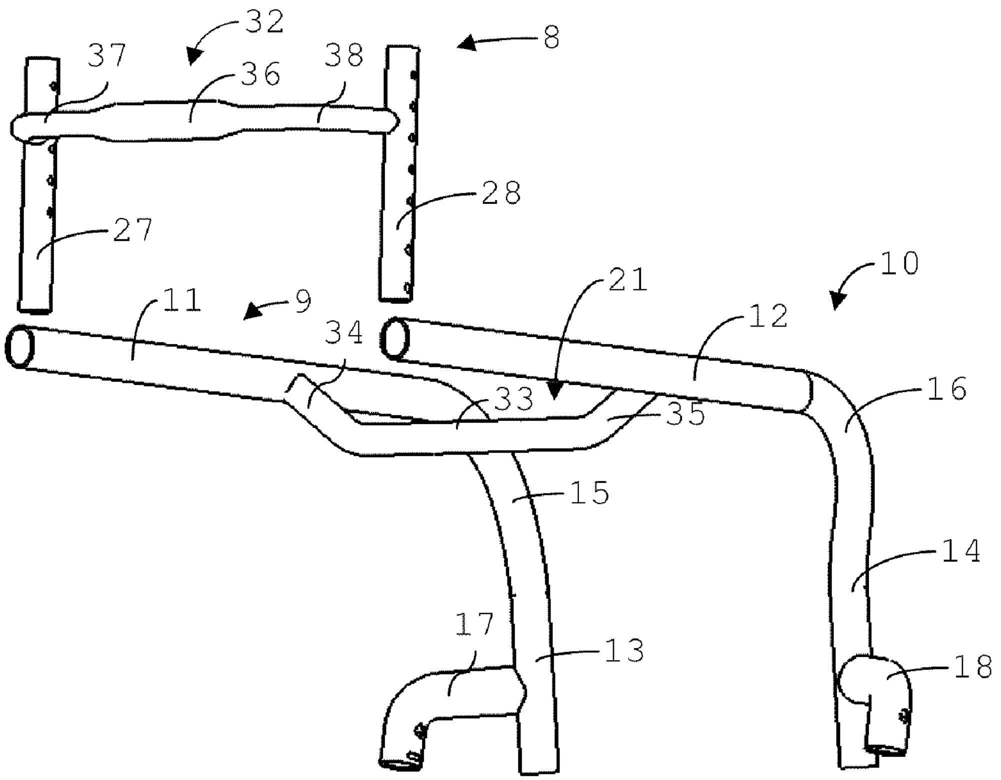
FIG. 5 is a perspective view of a base frame and backrest frame of the wheelchair of FIGS. 1-4.
Figure 6:
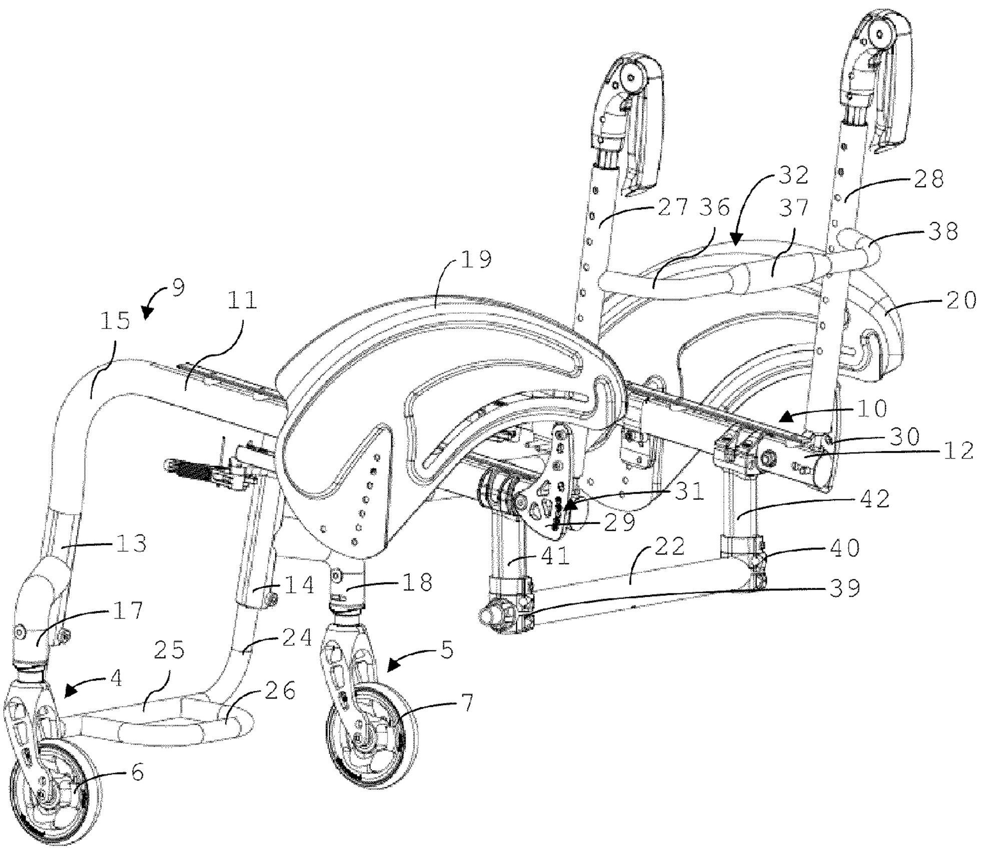
FIG. 6 is a perspective view of the wheelchair of FIGS. 1-4 with rear wheels removed to show an axle mounting assembly between the base frame and an axle tube.
Figure 7:
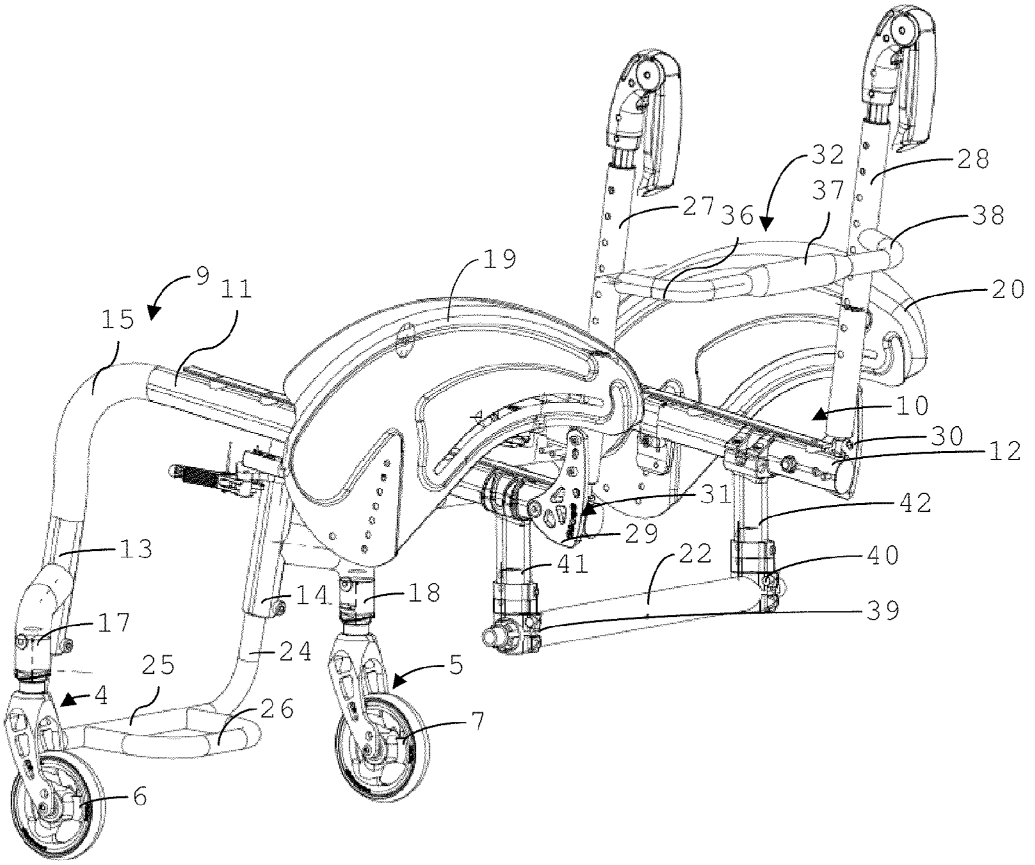
FIG. 7 is a perspective view similar to FIG. 6 with a spacer added to the axle mounting assembly.
Figure 8:
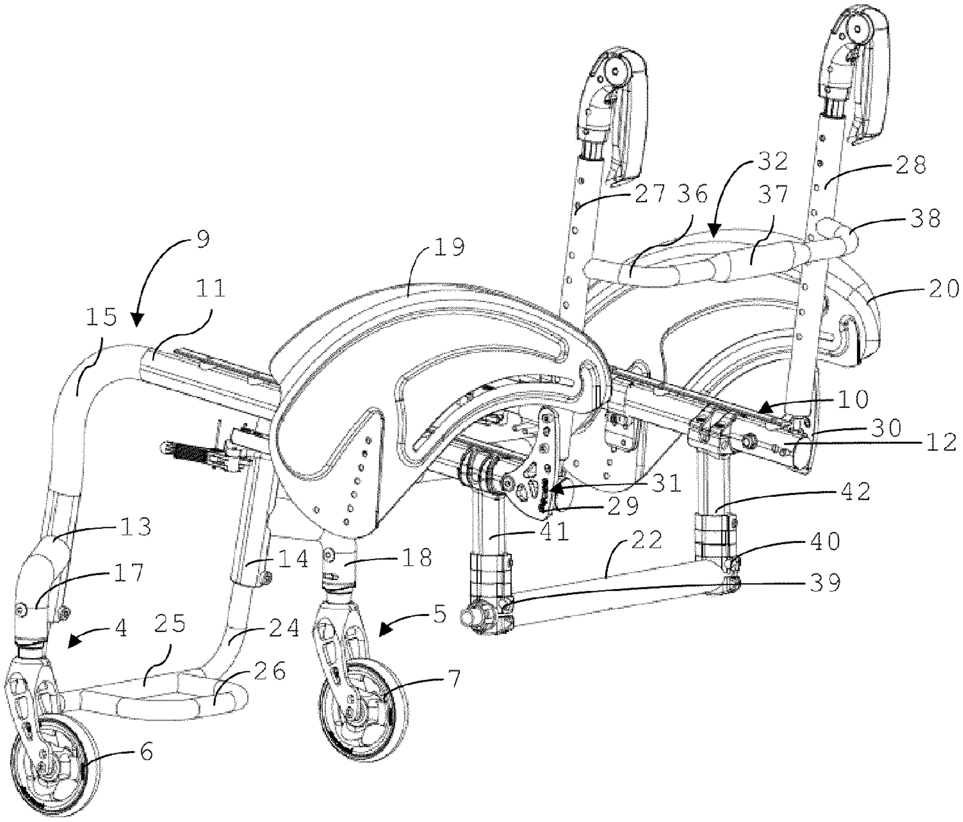
FIG. 8 is a perspective view similar to FIGS. 6 and 7 showing a second spacer.
Figure 9:
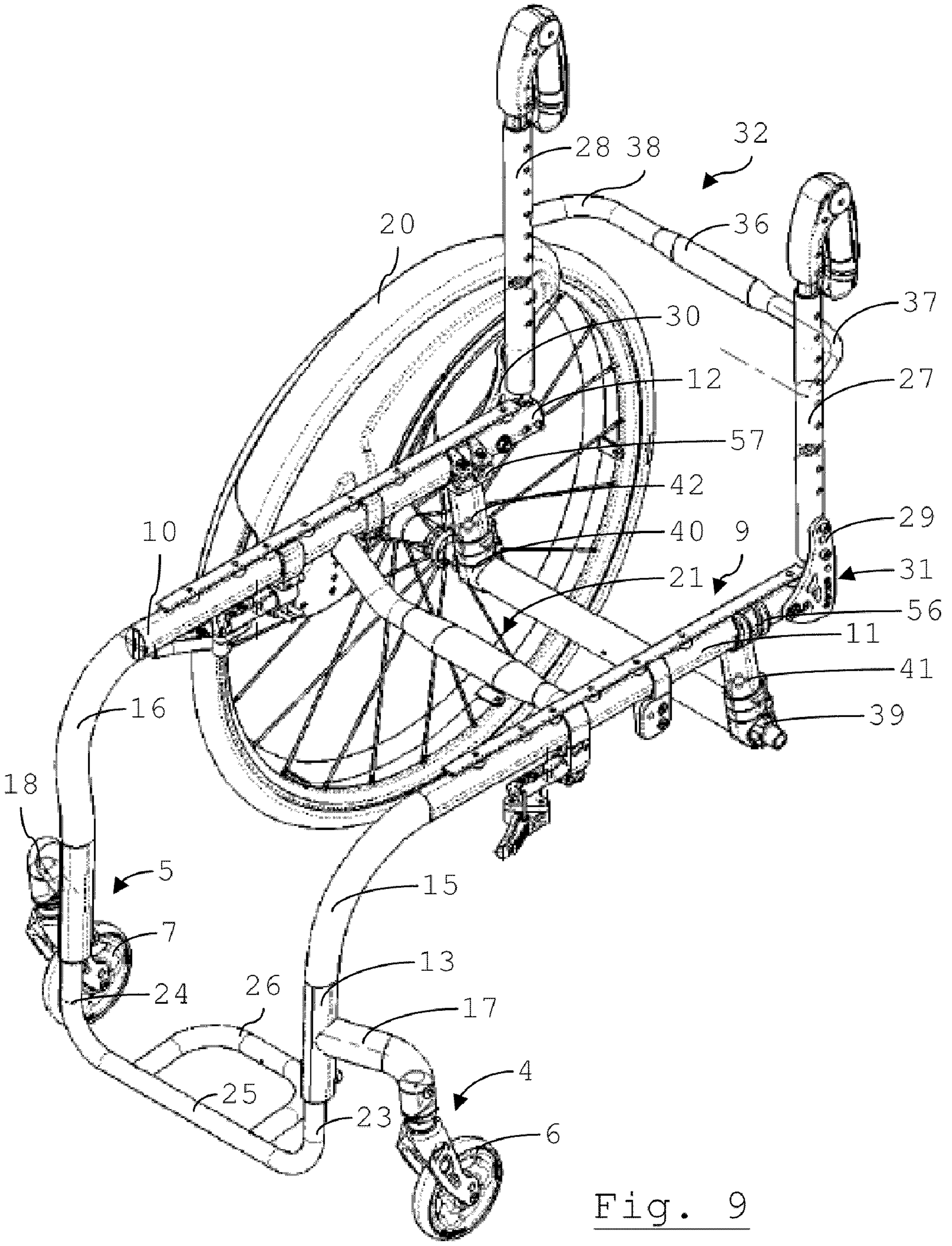
FIG. 9 is a perspective view of the wheelchair of FIG. 7, with one rear wheel removed for clarity.
Figure 10:
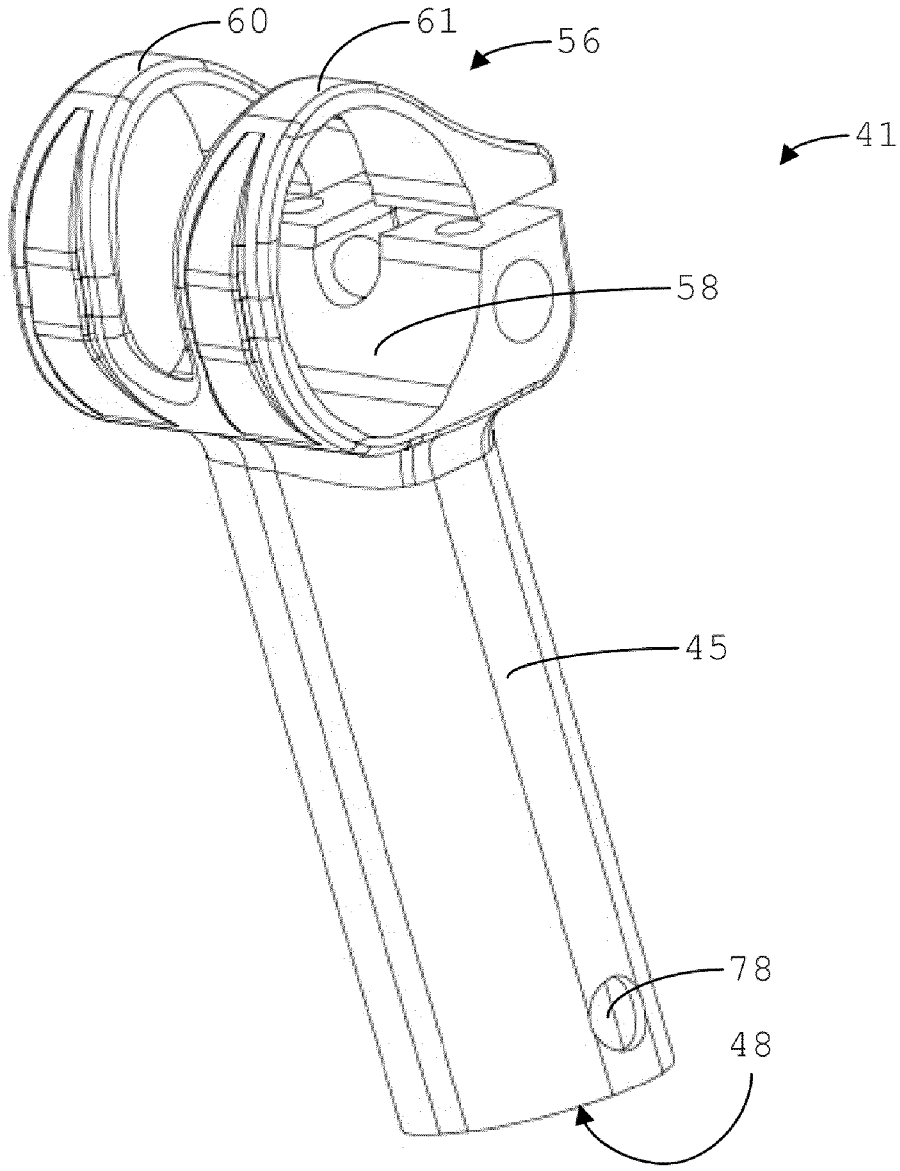
FIG. 10 is a perspective view of a frame mount portion of an axle mounting assembly.
Figure 11:
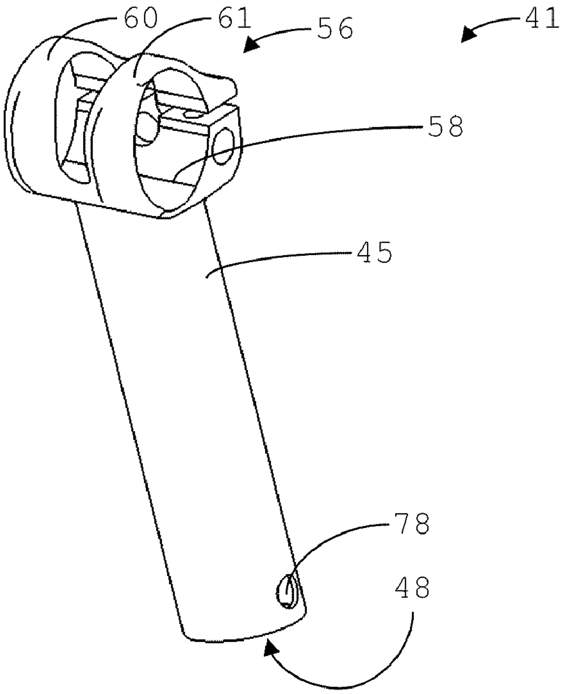
FIG. 11 is another perspective view of the frame mount of FIG. 10.

With particular reference to FIGS. 2 and 5, the curved sections 15,16 of the side frame members 9,10 are curved in multiple planes, such that the second legs 13,14 are separated from each other by a shorter distance than the first legs 11,12 of the side frame members 9,10. Thus, the seat can be relatively wide, whereas the second legs 13,14 of the side frame members 9,10 provide a more narrow support for the wheelchair occupant's legs.

The second legs 13,14 are supported by the caster wheel assemblies 4,5 via caster struts 17,18 in which the caster wheel assemblies 4,5 are partially accommodated. The caster struts 17,18 are attached with respective longitudinal ends to the sides of the respective second legs 13,14 at a position removed from the (lower) ends of the second legs 13,14 corresponding to the ends of the side frame members 9,10. The caster struts 17,18 place the caster wheels 6,7 at a wider distance from the longitudinal central axis of the wheelchair 1 than the second legs 13,14 in order to provide stability. They are also attached to second legs 13,14 of the side frame members 9,10 at an angle thereto so as to be oriented at least partly in a direction opposite to the direction d of displacement of the wheelchair 1, i.e. closer to the rear wheels 2,3. This makes the maneuverability of the wheelchair 1 easier for a user by shortening the wheelbase. Because the wheelchair 1 has an open frame, it is supported by the caster wheels 6,7 only via the caster struts 17,18 and second legs 13,14. There is no other connection between the caster wheel assemblies 4,5 and the first legs 11,12 of the side frame members 9,10. Similarly, the caster struts 17,18 form the only connections between the caster wheel assemblies 4,5 and the side frame members 9,10.

It is desirable to place the rear wheels 2,3 as close together as possible in view of the width of the seat, and thus also as close to the side frame members 9,10 as possible. The seat should be wide enough to accommodate an occupant comfortably, but, overall, the wheelchair 1 should be narrow for better maneuverability and access to buildings, transportation and the like. Maneuverability is enhanced if the set camber of the rear wheels 2,3 is maintained when the wheelchair 1 is occupied. It is desirable to minimize or generally eliminate substantial deflection or "sagging" of the frame, in particular rotation or torsion of the side frame members 9,10, under the weight of the occupant. If frame deflections become large, the wheels 2,3 would angle inwards at the top towards the first legs 11,12, and run against the frames or against side guards 19,20 mounted to the first legs 11,12 of the side frame members 9,10. To prevent this, the first legs 11,12 are directly connected by a first cross-brace 21, and indirectly by an axle tube 22. Additionally, a foot rest assembly with left and right foot rest frame members 23,24, in general alignment with and connected to the second legs 13,14, includes at least a first cross-member 25 interconnecting the left and right foot rest frame members 23,24. A further cross-member 26 is situated below a foot plate (not shown), in use.

For adjusting the height of the foot rest assembly, the left and right foot rest frame members 23,24 of the foot rest assembly can telescope within the second legs 13,14. The telescopic movement of the left and right foot rest frame members 23,24 can be fixed in one of a number of positions by fastening structures, e.g. in the form of biased pins in the foot rest frame members 23,24, arranged to co-operate with any of a series of holes in the second legs 13,14 of the side frame members 9,10. In the illustrated embodiment, the foot rest frame members 23,24 are clamped within the second legs 13,14 of the side frame members 9,10.

The backrest frame 8 is pivotally connected to the base frame by a connection mechanism that enables left and right backrest frame members 27,28 to be locked in a generally upright position or at any of several angles relative to the first legs 11,12 of the side frame members 9,10. This connection mechanism comprises left and right hinge plates 29,30, that connect the left and right backrest frame members 27,28 to the left and right side frame members 9,10, respectively. In the illustrated embodiment, the connection to the left and right backrest frame members 27,28 is fixed. The hinge plates 29,30 are pivotally connected to the side frame members 9,10. Alternatively, the connection member may be fixed to the side frame members and permit the backrest frame to pivot. A retractable pin (not shown in detail) engages one of an array 31 of apertures in the left hinge plate 29 to prevent the pivoting motion of the hinge plate 29 and left backrest frame member 27, and a similar locking mechanism is provided on the right side of the wheelchair 1. With the pin or similar engagement member retracted from the hinge plates 29,30, the backrest frame members 27,28 can be folded to a generally parallel position with first legs 11,12 of the side frame members 9,10. In this configuration, the wheelchair 1 can be transported easily, e.g. in the trunk of a car. It can be carried with one hand by the first cross brace 21 between the side frame members 9,10 or a similar second cross-brace 32 provided between the backrest frame members 27,28.

Referring now to FIG. 5, the first cross-brace 21 is comprised of a tubular structure having a central section 33 and first and second end sections 34,35. The end sections 34,35 terminate at the ends of the cross-brace 21 and connect to the left and right side frame members 9,10. They each have a central longitudinal axis angled away from a plane defined by the first legs 11,12 of the left and right side frame members 9,10, at least where they join the left and right side frame members 9,10. Thus, the central section 33 lies in a plane parallel to the plane defined by the first legs 11,12. There is therefore space between the central section 33 and a seat supported by the left and right first legs 11,12. By angling the end sections 34,35 in this way, the central section 33 can be relatively long, and need not be held exactly under the middle of the seat. In an alternative embodiment, the end sections 34,35 are in the plane of the left and right first legs 11,12, and curved sections angling out of this plane are provided between the central section 33 and the end sections 34,35.

Similar to the first cross-brace 21, the second cross-brace 32 is comprised of a tubular structure having a central section 36 and first and second end sections 37,38. The end sections 37,38 extend between the ends of the cross-brace 21 and the left and right side backrest frame members 27,28. They each have a central longitudinal axis angled away from a plane defined by the backrest frame members 27,28, at least where they join the left and right backrest frame members 27,28. Thus, the central section 36 lies in a plane parallel to the plane defined by the backrest frame members 27,28. There is therefore space between the central section 36 and a backrest (not shown) supported by the left and right backrest frame members 27,28. By angling the end sections 37,38 in this way, the central section 36 can again be relatively long.

The axle tube 22 is connected to the base frame via left and right axle tube clamp ends 39,40 of axle mounting assemblies (see FIGS. 2, 3, 6-9 and 15). The axle tube 22 accommodates camber tubes (not shown in detail) for holding axles of the rear wheels 2,3. The camber tubes are also held in position by the axle tube clamp ends 39,40. At least one of the camber tube and the axle is removable from the axle tube 22, so that the rear wheels 2,3 can be taken off the wheelchair frame when the wheelchair 1 needs to be transported. Thus, the (open) ends of the axle tube 22 provide housings for removably accommodating rear wheel axles.

The interconnection between the axle tube clamp 39,40 and the first legs 11,12 allows for movement of the axle tube 22 between the different pre-determined positions at varying distances to the first legs 11,12 of the side frame members 9. The positions are at varying distances to the seat. In this manner, the rear seat height can be adjusted.

Figure 15:
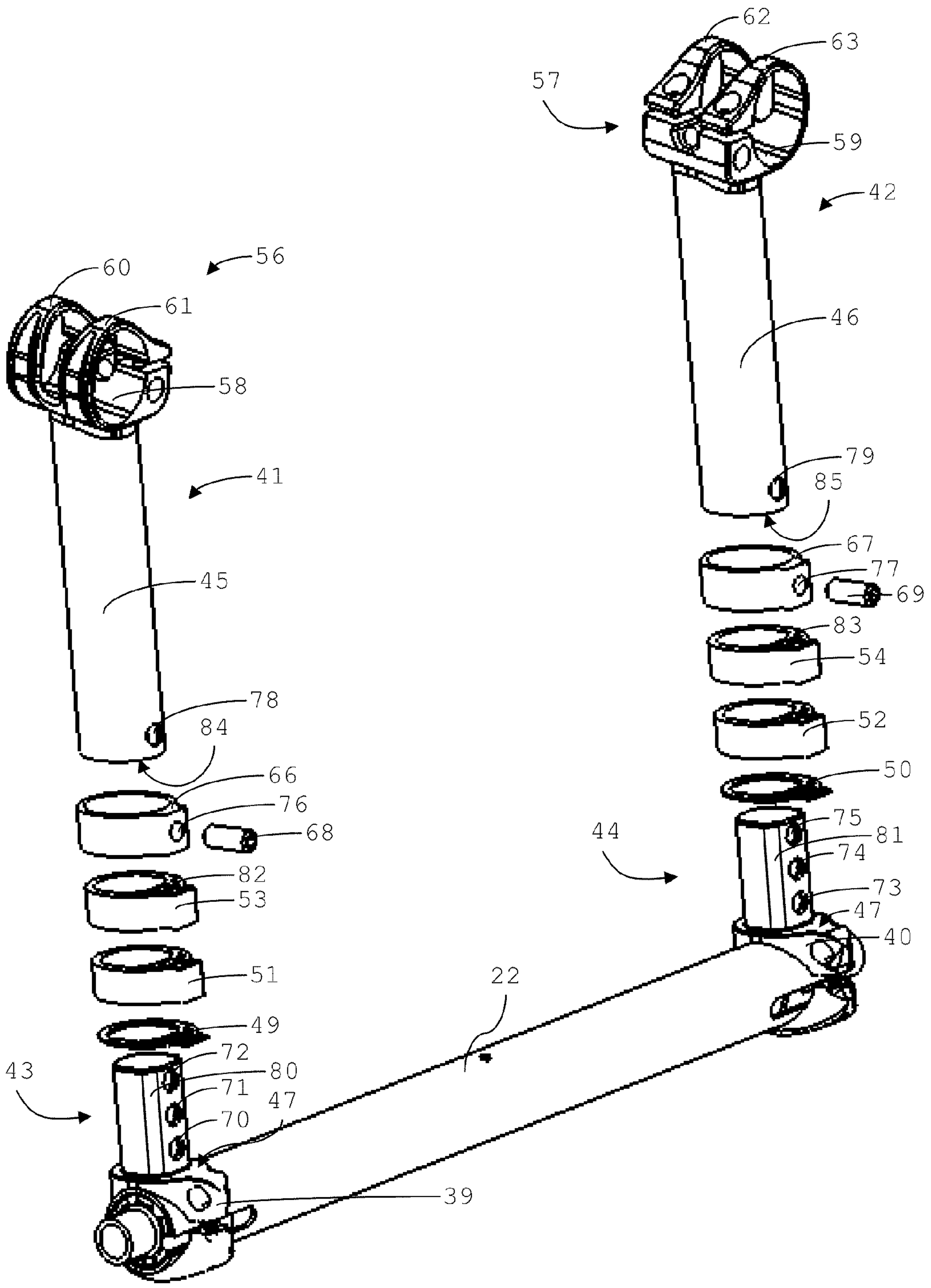
FIG. 15 is a detailed exploded view of an embodiment of an axle mounting assembly and axle tube.

The interconnection between the axle tube 22 and the first legs 11,12 of the side frame members 9,10 comprises two axle mounting assemblies including a frame mount 41,42 having a frame mount sleeve end 45,46 and an axle tube mount having the axle tube clamp end 39,40 and an axle tube mount post end 43,44. Each axle tube mount post end 43,44 is telescopically inserted into frame mount sleeve end 45,46, so as to extend over only part of the latter's length, because the axle tube mount post end 43,44 may be substantially shorter than the frame mount sleeve ends, as shown in FIG. 15. In the illustrated embodiment, the frame mounts 41,42 extend from the side frame members 9,10 toward the axle tube 22. In one embodiment, the frame mounts 41,42, and in particular the frame mount sleeve ends 45,46, are at right angles to the first legs 11,12. In another embodiment, the frame mount sleeve ends 45,46 are not precisely at right angles to the first legs 11,12 of the side frame members 9,10. Instead, they are at an angle of less than 90°, in particular at an angle in the range from 85° to 75°, to a longitudinal axis of the first legs 11,12. This angle is on the side facing away from the front wheels 6,7. It is noted that the frame mounts 41,42 may still be generally vertically oriented, because the first legs 11,12 need not be exactly horizontal. Generally, they will be angled slightly downwards towards the rear, so that an occupant of the wheelchair 1 will be kept in the seat.

The axle tube mount post ends 43,44 are directly connected to the axle tube clamps 39,40. The axle tube mount post ends 43,44 thus extend upwardly from the axle tube clamps 39,40 of the axle tube mounts. In the illustrated embodiment, the axle tube mount post ends 43,44 and respective tube clamps 39,40 are in fact integral parts of a single component. This can be a cast or forged component. There is thus no interface between the axle tube mount post ends 43,44 and respective tube clamps 39,40. The latter provide bases with support surfaces 47,48 (FIG. 15) for first spacers 49,50 or stacks of spacers 49-54 for transferring a longitudinal force from a respective lower end of the frame mount sleeve ends 45,46 of the frame mounts 41,42 to the respective support surface 47,48.

Because the axle tube clamps 39,40 are provided at the longitudinal ends of the axle tube mount post ends 43,44, the axle tube clamps 39,40 are situated immediately below the first legs 11,12 of the side frame members 9,10, right at the ends of the axle tube 22. Thus, the wheels 2,3 can be placed close to the side frame members 9,10, but there is a relatively low moment arm on the axes that would tend to tilt them and thereby affect the camber of the wheels 2,3. Because there is a single axle tube 22 interconnecting the frame mounts 41,42 and axle tube mounts (axle tube clamp ends 39, 40 and axle tube mount post ends 43,44), they will have less tendency to bend.

Figure 13:
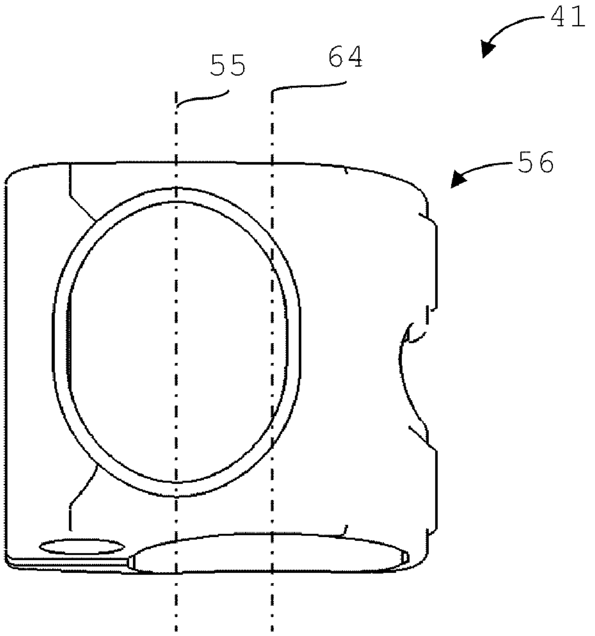
FIG. 13 is a bottom view of the frame mount of FIGS. 10-12.

In the illustrated embodiment, the sleeve ends 45,46 of the frame mounts 41,42 are non-circular, in this case oval, in cross-section (see FIG. 13). An axis 55 aligned with a major diameter of the non-circular cross-section is predominantly aligned with the longitudinal central axes of at least the first legs 11,12 of the side frame members 9,10. This provides extra rigidity to prevent bending in a direction parallel to the direction d of displacement of the wheelchair 1. Other non-circular cross-sections will also provide this effect. Alternatively, the sleeve ends 44,45 may have a circular cross section, if desired.

At a top end of the frame mounts 41,42, the sleeve ends 45,46 are connected to frame clamps 56,57, illustrated as double tube clamps 56,57. The connection could be established by chemical bonding or welding. In the illustrated embodiment, however, the double tube clamps 56,57 are integral parts of the frame mounts 41,42, meaning that there is no internal or external interface between the tube clamps 56,57 and sleeve ends 45,46 of the frame mounts 41,42. The double tube clamps 56,57 are movable along the first legs 11,12 of the side frame members 9,10, so that the distance between the caster wheels 6,7 and the rear wheels 2,3 can be changed. Because the frame mounts 41,42 are also interconnected by the axle tube 22 (via the axle tube mounts), the distance between the left caster wheel 6 and rear wheel 2 and the distance between the right caster wheel 7 and rear wheel 3 remains the same. The double tube clamps 56,57 also contribute to maintaining the distance between the front wheels 6,7 and rear wheels 2,3 constant.

Each double tube clamp 56,57 comprises a saddle 58,59, which, in use, supports the respective first leg 11,12 of a side frame member 9,10. In the illustrated embodiment, the saddle 58,59 is comprised in each of two clamp collars 60-63 extending over more than 180° around the side frame member 9,10 when inserted into the double tube clamp 56,57. In an alternative embodiment (not shown), the saddles can be comprised of tube clamps comprising opposite clamp halves that are held together by bolts or similar fastening devices. However, the illustrated embodiment allows one to loosen the double tube clamps 56,57 to move the frame mounts 41,42 in longitudinal direction (parallel to the direction d of displacement), without risk of the frame mounts 41,42 coming off.

For further rigidity, the first legs 11,12 may also have a non-circular, e.g. oval, cross-section. The double tube clamps 56,57, in particular also the saddles 58,59 are appropriately configured for the cross-sectional shape of the first legs 11,12.

Figure 12:
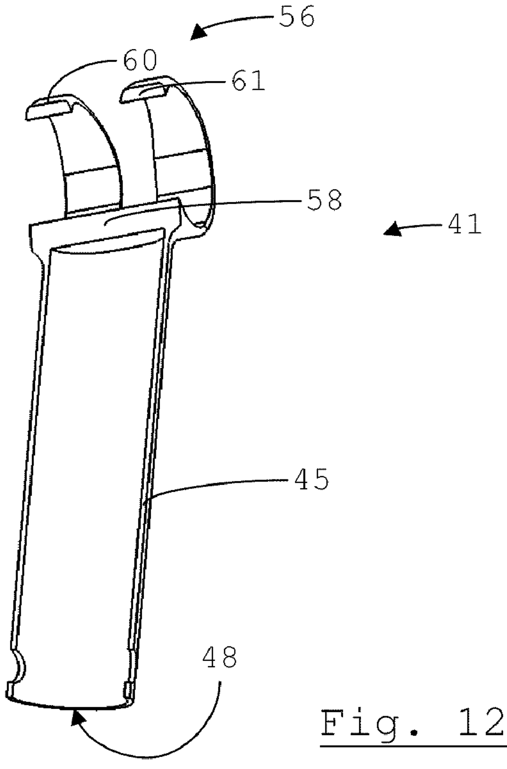
FIG. 12 is a cross-sectional view of the frame mount of FIGS. 10 and 11.

It will be apparent, in particular from FIGS. 12 and 13, that the frame mounts 41,42 have a widening or filleted transition between the sleeve end 45,46 and the double tube clamps 56,57. Thus, the minimum diameter of the sleeve ends 45,46 can be lower than the minimum diameter of the first legs 11,12, if required. Moreover, the first legs 11,12 of the side frame members 9,10 are supported over a longer distance by the saddles 58,59. Thus, the widening is at least in the cross-sectional plane through a longitudinal axis 64 of the saddle 58,59 and parallel to or through a longitudinal axis of the sleeve ends 45,46.

Figure 14:
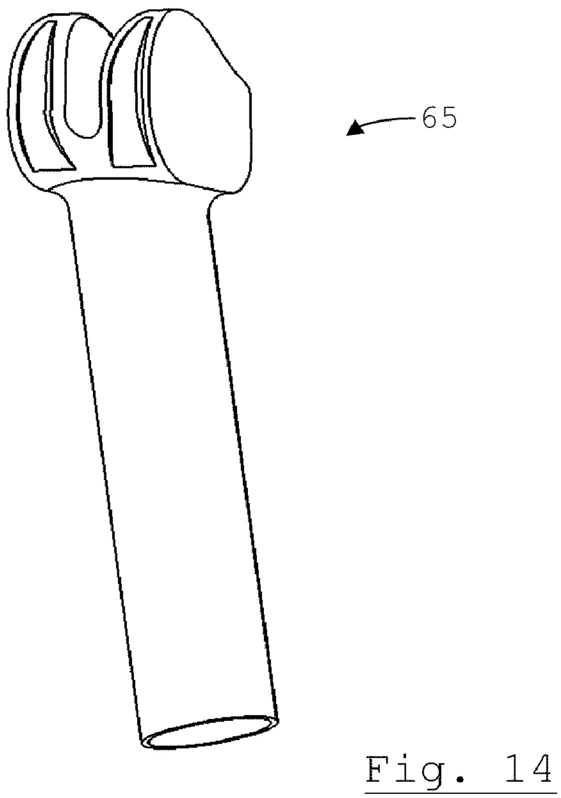
FIG. 14 is a perspective view of an embodiment of a frame mount preform component for forming the frame mount of FIGS. 10-13.

In the illustrated embodiment, the basic configuration of the frame mounts 41,42 may be provided by forging. FIG. 14 shows an intermediate frame member 65, or raw forging, formed after the forging steps have been carried out. Further stages of the manufacturing process involve milling and cutting to provide the double tube clamps 56,57. The forging steps involve the use of one or more tools which are negatives of the shape of the intermediate frame member 65. These are used to provide the hollow tubular elongated section 45 and the transition between the elongated section 45 and the end part that will finally comprise the saddle 58 of the double tube clamp 56. Forging is carried out under controlled conditions. The temperature is controlled to a point at which the material of the frame mounts 41,42 is quite ductile. The force with which the tools are applied to the workpiece is controlled relatively precisely. Afterwards, a heat treatment can be carried out. The forged nature of the transition between the sleeve end 45 and the end part that will finally comprise the saddle 58 of the double tube clamp 56, means that the frame mounts 41,42 are able to withstand jolts in the direction d of displacement relatively well. There is little risk of tearing at the upper portions of the sleeve ends 45,46. This effect is achieved without having to provide the sleeve ends 45,46 with relatively thick walls.

Referring to FIG. 15, at the opposite ends to the frame clamps 56,57 of the frame mounts 41,42, there are provided vertical tube clamps comprising respective collars 66,67 and bolts 68,69 for engaging one of a plurality of internally threaded apertures or bores 70-75. It is noted that the bores 70-75 extend only a short distance into the solid upright posts 43,44. They are thus not through-holes. The bolts 68,69 are inserted through bores 76,77 in the collars 66,67 and apertures 78,79 in the upright tubes 41,42. In one embodiment, the bores 76,77 in the collars are also threaded. In an alternative embodiment, the bores 76,77 are through-holes.

It is observed that, in the illustrated embodiment, the insides of the internally threaded bores 70-75 do not provide support surfaces, and the bolts 68,69 do not function as elements for transferring a longitudinally directed force from an end of the frame mounts 41,42 to the axle tube mount post ends 43,44, because the spacers 49-54 perform this function. In other embodiments, however, this need not be the case.

Aside from the one aperture 78,79, the sleeve ends 45,46 of the frame mounts 41,42 may be generally smooth. The absence of an array of apertures through the walls of the sleeve ends 45,46 of the frame mounts 41,42 makes them stronger.

Although the sleeve ends 45,46 of the frame mounts 41,42 have a generally oval cross-sectional shape, also on the inside, the axle tube mount post ends 43,44 may have a different cross-sectional shape, so that a certain amount of play between the post end and the telescopically engaged sleeve end 45,46 may exist. Due to the use of clamps to secure the frame mounts 41,42 to the post ends 43,44, the play or component looseness can be accommodated and thus does not matter greatly. On the other hand, manufacture of the components comprising the post ends 43,44 is thereby simplified, because the tolerance ranges can be larger. It is noted, however, that the post ends 43,44 may also have a non-circular cross-sectional shape, so that twisting of the post ends 43,44 within the sleeve ends 45,46 of the frame mounts 41,42 is prevented due to a shape-lock that is established when the collars 66,67 are tightened. In this case, the post ends 43,44 are cylindrical with an octagonal cross-sectional shape. The sides of the octagon are alternately short and long, defining a shape corresponding to that of a rectangle with truncated corners. When the bolts 68,69 are tightened, the collars 66,67 act on the surfaces defined by the short sides that form the truncations. Two such surfaces 80,81 are indicated in FIG. 15.

As far as the spacers 49-54 are concerned, at least one smaller spacer 49,50 comprises a non-metal material, e.g. plastic, rubber or artificial rubber. This spacer 49,50 may be reinforced by metal components for further structural rigidity. The non-metal surface of the spacer prevents metal-on-metal contact between the axle tube mount and the frame mount. In one embodiment, at least the smaller spacer 49,50 may be present, even with the wheelchair 1 in the lowest position, so that a quiet ride is ensured.

Top surfaces 82,83 of the upper spacers 53,54 abut and support end faces 84,85 of the frame mounts 41,42, as well as lower surfaces of the collars 66,67. Thus, the walls of the sleeve ends 45,46 of the frame mounts 41,42 are generally subjected to longitudinal, compressive forces. There is no force on the edges of the apertures 78,79.

In the illustrated embodiment, the spacers 49-54 are of cylindrical configuration with generally identical cross-sectional shapes, at least where the outer circumference is concerned. Thus, a smooth appearance is created, with no sharp edges at interfaces between spacers 49-54. This is continued due to the fact that the outer circumference of the cross-sectional shape of the spacers 49-54 is generally identical to that of the collars 66,67.

In general, the wheelchair 1 will be provided with a set of spacers 49-54 for adjustment by the user. The user may select an appropriate number of spacers of an appropriate type from the set. In an alternative embodiment, the set of spacers differs in at least one of dimensions and composition. In the illustrated embodiment, the heights of the larger spacers 51-54 correspond to the distances between the successive internally-threaded bores 70-75 in the post ends 43,44. They may be equidistant or be placed at different intervals, so that either spacers of the same height or spacers of different height will be used.

The spacers 49-54 transmit the longitudinal forces between the frame mounts 41,42 and upright posts 43,44, so that the apertures 78,79 and threads of the bores 70-75 are not subjected to damaging forces under the weight of the occupant of the wheelchair 1. The post ends 43,44 lend extra rigidity to the sleeve ends 45,46 of the frame mounts 41,42.

The invention is not limited to the embodiments described above, which may be varied within the scope of the claim. The features mentioned in the description, claims and drawings can be essential to the invention in its various implementations both individually and in any combination.

The members of the wheelchair frame can be made of a composite material or a metal or metal alloy. Suitable materials for the forged frame mounts 41,42, and the axle tube mounts may include aluminum-scandium alloys, aluminum alloys from the 7000 series, particularly aluminum 7003, or aluminum from the 6000 series. Aluminum 7000 has a relatively high tensile strength.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A wheelchair frame assembly comprising:

a frame member having a first leg adapted to support a seat and a second leg configured to support a caster wheel, and an axle tube that supports a drive wheel for rotation;

an axle mounting assembly including an axle tube mount and a frame mount, the axle tube mount having a clamp end configured to engage a portion of the axle tube and a post end that extends from the clamp end, the frame mount having a clamp end configured to engage a portion of the frame member and a sleeve end configured to telescopically connect the axle tube mount post end; and at least one spacer element configured to cooperate with the axle tube post end to alter the distance between the frame member and the axle tube.

2. The wheelchair frame assembly of claim 1 wherein the axle tube mount clamp end includes a support surface and the frame mount sleeve end includes a load face such that the at least one spacer element cooperates with the axle tube mount clamp end support surface and the frame mount sleeve end load to transfer longitudinal forces between the axle tube mount and the frame mount through the spacer element.

3. The wheelchair frame assembly of claim 2 wherein the axle tube mount post end is telescopically received in the frame mount sleeve end and a collar is configured to be disposed over the frame mount sleeve end, the collar having an aperture that is aligned with an aperture formed through the sleeve end, the collar aperture and the sleeve end aperture being further aligned with a threaded aperture formed in the axle tube mount post end such that a fastener clamps the collar and sleeve end to the post while maintaining longitudinal force transfer through the spacer element.

4. The wheelchair frame assembly of claim 2 wherein the at least one space element is a spacer element selected from a plurality of spacer elements having at least two different height dimensions.

5. The wheelchair frame assembly of claim 4 wherein the frame member is a pair of spaced-apart frame members, the axle mounting assembly is a pair of spaced-apart axle mounting assemblies that support opposite ends of the axle tube and each axle mounting assembly is generally in a coplanar orientation with each of the spaced-apart frame member first leg tubes, and the spaced-apart axle mounting assemblies are generally parallel.

6. The wheelchair frame assembly of claim 5 wherein the axle tube mount clamp ends engage the ends of the axle tube.

7. The wheelchair frame assembly of claim 6 wherein the frame mount sleeve end has a non-circular cross section that provides a stiffer bending characteristic in the coplanar orientation with the frame member first leg than in a transverse direction to the frame member first leg.

8. The wheelchair frame assembly of claim 7 wherein the axle tube supports a camber tube at each end and wherein the axle tube clamp ends secure the camber tubes to the ends of the axle tube.

9. The wheelchair frame assembly of claim 8 wherein the camber tubes support a pair of spaced-apart drive wheels for rotation such that the weight of a user does not substantially alter the camber orientation of the drive wheels.

10. The wheelchair frame assembly of claim 6 wherein the frame mount sleeve end extends at an angle from the frame mount clamp end.

11. The wheelchair frame assembly of claim 10 wherein the angle is about 90 degrees.

12. The wheelchair frame assembly of claim 10 wherein the angle is between about 75 degrees to about 85 degrees.

13. The wheelchair frame assembly of claim 1 wherein the frame mount clamp end circumferentially engages the frame member first leg such that the drive wheel is selectively positioned relative to the caster.

14. The wheelchair frame assembly of claim 1 wherein the frame mount sleeve end and the frame member first leg have non-circular cross sections each having a major diameter and a minor diameter such that the sleeve end minor diameter is smaller than the frame member first leg minor diameter.

15. A wheelchair comprising:

a frame assembly having a pair of spaced apart side frame members, each side frame member having a first leg configured to support a seat and a second leg configured to support a caster leg and further configured to telescopically support a footrest;

a cross member that connects the spaced-apart side frame members;

an axle tube that supports a pair of spaced-apart drive wheels for rotation; and an axle mounting assembly comprising:

- a pair of spaced-apart axle tube mounts, each axle tube mount having a clamp end that engages an end of the axle tube and a post end that extends from the clamp end;
- a pair of frame mounts, each frame mount having a clamp end configured to engage the frame member first leg and a sleeve end configured to telescopically connect the axle tube mount post end; and
- at least two spacers, each spacer being disposed between the axle tube clamp end and the frame mount sleeve end such that the spacers transfer longitudinal forces from the frame assembly to the axle tube.

16. The wheelchair of claim 15 wherein each of the frame mount sleeve ends include a collar disposed about the outer diameter of the sleeve end, the collar having an aperture that is aligned with an aperture formed through the sleeve end, the collar aperture and the sleeve end aperture being further aligned with a threaded aperture formed in the axle tube mount post end such that a fastener clamps the collar and sleeve end to the post while maintaining longitudinal force transfer through the spacer element.

17. The wheelchair of claim 16 wherein the axle tube mount post ends are octagonal in shape where the sides of the octagon alternate between a short side and a long side, the collar acting on at least one of the short sides when the fastener is tightened.

18. The wheelchair of claim 15 wherein the at least two spacers are a plurality of spacers having two spacers made from a non-metallic material, the two spacers configured to provide noise isolation between the axle tube and the frame assembly.

19. A wheelchair comprising:

a frame assembly having a pair of spaced-apart side frame members, each side frame member having a first leg configured to support a seat, a second leg configured to support a caster leg, and a curved section, the curved section connecting the first leg to the second leg such that the distance between the spaced-apart first legs is greater than the spaced-apart second legs; a cross member that connects the spaced-apart first legs; a footrest assembly having first and second frame members that are telescopically connected to the second legs and a footrest cross-member 25 interconnecting the left and right foot rest frame members; and an axle mounting assembly comprising:

a pair of spaced-apart axle tube mounts, each axle tube mount having a clamp end that engages an end of the axle tube and a post end that extends from the clamp end;

a pair of frame mounts, each frame mount having a clamp end configured to engage the frame member first leg and a sleeve end configured to telescopically connect the axle tube mount post end; and at least two spacers, each spacer being disposed between the axle tube clamp end and the frame mount sleeve end such that the spacers transfer longitudinal forces from the frame assembly to the axle tube.

20. The wheelchair of claim 19 wherein the at least two spacers are a plurality of spacers having two spacers made from a non-metallic material, the two spacers configured to provide noise isolation between the axle tube and the frame assembly.

* * * * *